United States Patent
Felde et al.

(10) Patent No.: US 6,445,651 B1
(45) Date of Patent: Sep. 3, 2002

(54) CARTRIDGE ORIENTATION INSERTION DETECTION FOR MASS STORAGE SYSTEMS INCLUDING FINGER DETECTIONS OF RECESSES IN THE CARTRIDGES

(75) Inventors: Steven Lloyd Felde; Thomas William Haberman; Raymond Yardy, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/633,251

(22) Filed: Aug. 4, 2000

(51) Int. Cl.[7] .............................................. G11B 17/22
(52) U.S. Cl. ............................... 369/30.41; 369/30.34; 360/92
(58) Field of Search .............................. 369/36, 34, 37, 369/38, 39, 30, 30.41, 30.43, 30.45, 30.34, 30.28, 30.3, 30.32, 30.38; 414/277, 280, 807; 360/98.06, 92

(56) References Cited

U.S. PATENT DOCUMENTS

| | | | | |
|---|---|---|---|---|
| 4,675,856 A | * | 6/1987 | Rudy et al. ..................... | 369/36 |
| 5,357,495 A | * | 10/1994 | Solhjell ........................ | 369/34 |
| 5,427,489 A | * | 6/1995 | Chalmers et al. ............ | 414/277 |
| 5,724,321 A | * | 3/1998 | Vishlitzky ..................... | 369/30 |
| 5,963,514 A | * | 10/1999 | Kanetsuku et al. ............ | 369/34 |
| 6,059,509 A | * | 5/2000 | Ostwald ....................... | 414/277 |
| 6,262,863 B1 | * | 7/2001 | Ostwald et al. ................ | 360/92 |

* cited by examiner

Primary Examiner—Ali Neyzari
(74) Attorney, Agent, or Firm—James A. Pershon

(57) ABSTRACT

In a mass storage library, an input/output station for inserting cartridges into and out of the library includes a door pivotally mounted to the station through cams that pivotally rotate a toggle bracket having fingers, one for each cartridge cell in the input/output station. Each cartridge used at least in the input/output station includes a cartridge orientation indicator in the form of a recess at one top edge of each cartridge. After inserting the cartridges into the cells of the input/output station, the door is closed rotating the toggle bracket and its fingers into the recess of each cartridge. The door will close if all of the cartridges have the recess correctly oriented to permit the fingers to clear the cartridges. If at least any one or more of the cartridges are incorrectly inserted into the cell of the station, the toggle bracket fingers will not clear the cartridges and the toggle bracket blocks the closure of the door thereby preventing further operation of the input/output station until all cartridges placed in the station are correctly inserted. A stop prevents insertion of the cartridge into the library robotics when the input/output station is open.

6 Claims, 7 Drawing Sheets

CARTRIDGE ORIENTATION INSERTION DETECTION FOR MASS STORAGE SYSTEMS INCLUDING FINGER DETECTIONS OF RECESSES IN THE CARTRIDGES

FIELD OF THE INVENTION

This invention relates generally to an information storage library and more specifically to the detection of correct orientation of cartridges during insertion into information storage libraries.

BACKGROUND OF THE INVENTION

Information storage libraries require that the cartridges be correctly aligned when placed into the input/output station. There is the possibility that the operator could input a cartridge into the library input/output station in the incorrect orientation. The library then is unable to access that particular cartridge until the operator intervenes and correctly orients the tape cartridge. The prior art system did not detect the incorrectly oriented cartridge until an attempt was made to have the accessor withdraw the cartridge from the input/output station and the incorrect orientation was detected. The incorrect orientation made the cartridge absolutely unusable to the system and the processing of the data on that cartridge would have to wait for the intervention of the operator to correctly orient the cartridge.

In some prior art system, such as that disclosed in U.S. Pat. 5,963,514, issued to Kanutsuki, et al, on Oct. 5, 1999 and entitled, "Accessor Position Alignment In A Library Apparatus", a reference flag was used that is read by a sensor on the accessor side of the tape library to detect the absolute position of the cartridge to verify the correct positioning for the operation of the accessor to insert or extract the cartridge. The use of the reference flag in the diagnostic cell ensured the error correction and what is called the initial step or initial operation to allow the accessor to carry out the insertion or extraction of the cartridge correctly into the reading station. This prior art required the accessor to access the cartridge in order to detect the incorrect positioning.

Other detection systems also required that the cartridge be initially detected by the accessor before the incorrect positioning is detected. In the IBM Technical Disclosure Bulletin of March, 1994 at Pages 205–6, a laser bar-code scanner is used to detect cartridges that are placed upside down in the library. The bar-code reader on the accessors scans the tape cartridge label and detects whether the label is being read with a forward scan or a backward scan. The knowledge of the label orientation allows the automated tape library system to know if the cartridge label is upside down or right-side up. The automated tape library can then take appropriate action if the label is upside down. This action is to allow access to the cartridge by the operator. But as in other prior art systems, the cartridge must first be accessed by the library system before the error is detected.

There is an ongoing need for the immediate detection of the incorrect orientation of a cartridge in a system library without the system going through an operation to detect the incorrectly oriented cartridge and then requiring the operator to correctly orient the cartridge.

It is, therefore, an object of the present invention to provide a means for immediately detecting the incorrect orientation of a cartridge in an information storage library.

Another object of the present invention, therefore, is to provide a means for the operator to immediately detect the incorrect orientation of the cartridge when the cartridge is being placed into the information storage library.

SUMMARY OF THE INVENTION

The present invention has been developed with a view of eliminating the problems of the prior art, and is, therefore, an object of the present invention to provide a system library apparatus which is capable of ensuring the correct insertion of cartridges into the system by an operator and for the operator to immediately detect the incorrect orientation and correct the error before the system attempts to use the data from that cartridge within the data processing system.

In most library storage systems, an input/output station is provided for the insertion of cartridges that are to be used within the library system for either adding data to the cartridges or extracting data from the cartridges for use within the data processing system. The standard library apparatus includes an input/output station which has a door which an operator swings open to allow access by the operator for insertion of cartridges into the input/output station. The door according to the present invention is pivotally mounted to the station through cams that pivotally rotate a toggle bracket having fingers, one for each cartridge cell in the input/output station. Each cartridge used at least in the input/output station includes a cartridge orientation indicator in the form of a recess at one edge of each cartridge. After inserting the cartridges into the cells of the input/output station, the door is closed rotating the toggle bracket and its fingers into the recess of each cartridge. The door will close if all of the cartridges have the recess correctly oriented to permit the fingers to clear the cartridges. If any one or more of the cartridges are incorrectly inserted into the cell of the station, the toggle bracket fingers will not clear the cartridges and the open toggle bracket blocks the closure of the door thereby preventing further operation of the input/output station until all cartridges placed in the station are correctly inserted. The failure to close is also immediately detectable by the operator.

The toggle bracket fingers are positioned to sense the cartridge orientation indicator, in the preferred embodiment of the invention, the cartridge recess area, and to prevent the door from closing if the toggle finger does not find that the recess is oriented correctly which signifies that the cartridge was inserted incorrectly. The jamming of the toggle finger prevents the toggle bracket from closing to its home position which in turn prevents the door from closing fully and, therefore, signals to the operator that the cartridge was not oriented correctly. The operator can then reopen the input/output station to allow the operator to correctly orient the cartridge without requiring that the system perform an accessing operation before the detection of the incorrectly oriented cartridge is noticed. The rotation of the toggle bracket further blocks the space on the robotics side of the mechanism for the accessor from removing the cartridges for use within the system by taking the cartridge to the read/write station. The door to the input/output system in the present invention does not need to rotate to become the cartridge stop point as in prior art systems. The toggle bracket takes on that function permitting the input/output mechanism to occupy less of the working area in the robotics section. With the present invention there is no need for the library system accessor to complete a cycle to scan for a correctly oriented cartridge label or for that matter to detect an empty cell since the invention does not permit the closing of the input/output door and, therefore, immediately signals to the operator that the cartridge was inserted incorrectly and needs reorientation. The operator can immediately reorient the cartridge, close the door, and immediately process the data on the cartridge in the first accessor pass.

The foregoing and other features and advantages of the invention will be apparent from the following more particular description of the preferred embodiment of the invention, as illustrated in the accompanying drawings.

DETAILED DESCRIPTION OF THE INVENTION

Referring to the illustrations, like numerals correspond to like parts depicted in the figure. The invention will be described as embodied in an automated magnetic tape library storage subsystem for use in a data processing environment. Although the invention shown uses magnetic tape cartridges, one skilled in the art will recognize that the invention equally applies to optical disk cartridges or other removable storage media. Furthermore, the description of an automated magnetic tape storage system is not meant to limit the invention to data processing application as the invention herein can be applied to storage and cassette handling systems in general.

Figure 1:
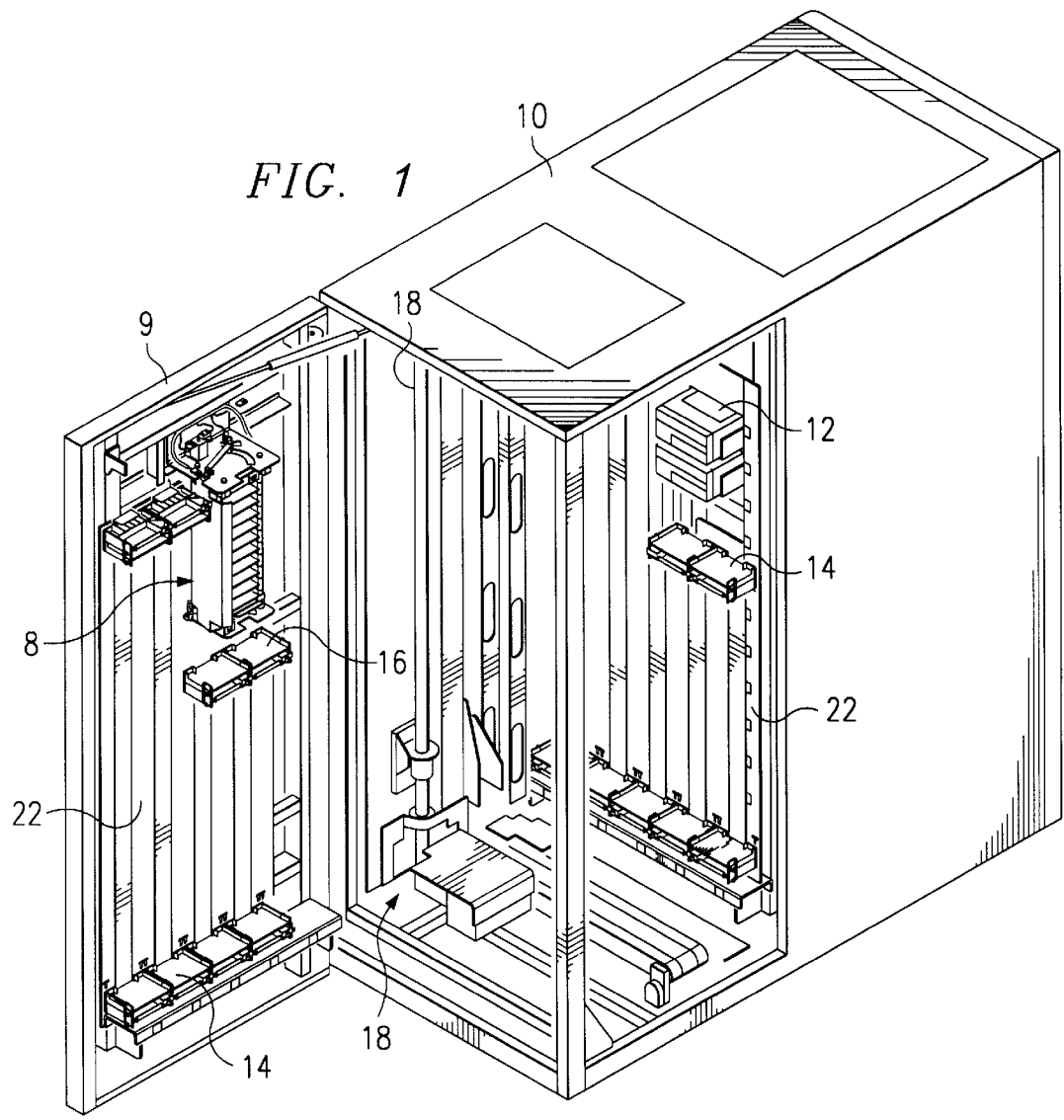
FIG. 1 is a perspective view of an automated storage and retrieval data processing library employing the input/output station of the present invention.

FIG. 1 is a perspective view of one type of an automated information storage and retrieval library 10 employing input/output station 8 of the present invention mounted on door 9. The library 10 includes one or more data recorder modules or drives 12, a plurality of cartridges 14 stored in a bank of cavities comprising storage cells 16 and forming a storage module, an accessor 18 for transporting a selected cartridge between a storage cell and a drive 12. The accessor 18 includes a cartridge gripping mechanism (not shown). The accessor 18 can access cartridge either from the storage cells 16 or from an input/output station 8. Only a few cartridges 14 and storage cells 16 are shown. It should be noted that the entire open section of the library 10 in operation is generally completely lined with storage cells 16, each containing one cartridge 14.

Figure 2:
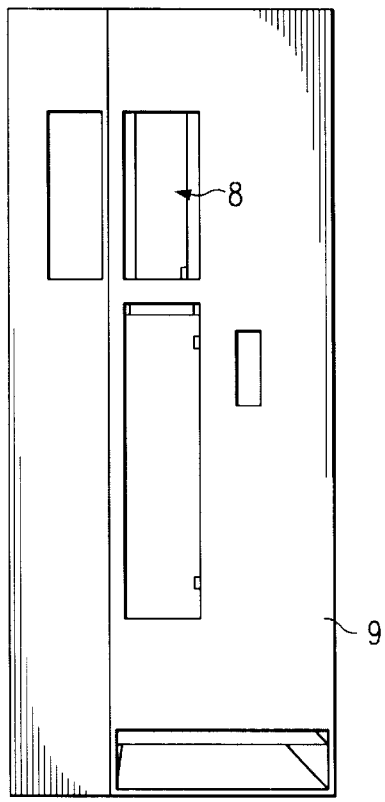
FIG. 2 is a frontal view of the library storage system showing the input/output port station positioning.

The drives 12 can be optical disk drives or magnetic tape drives and the cartridge can contain optical or magnetic media, respectively. The storage cells 16 are supported by a mounted plate 22 to hold the cartridges 14 in correct alignment with the cartridge gripper of the accessor 18 and also in alignment with the drives 12. The library 10 also includes a library data director or controller that connects with, and controls the actions of the drives 12 and the accessor 18. FIG. 2 shows a frontal view of the library system 10 with the input/output station 8 positioned for easy access by an operator to input cartridges required by the library system and to remove cartridges after the reading and/or writing of the media in the cartridges is completed. The input/output station 8 is shown positioned next to the mounting plate 22 which, together with the storage cells 16, form one of a plurality of storage cell mounting arrays and is shown in FIG. 3.

Figure 3:
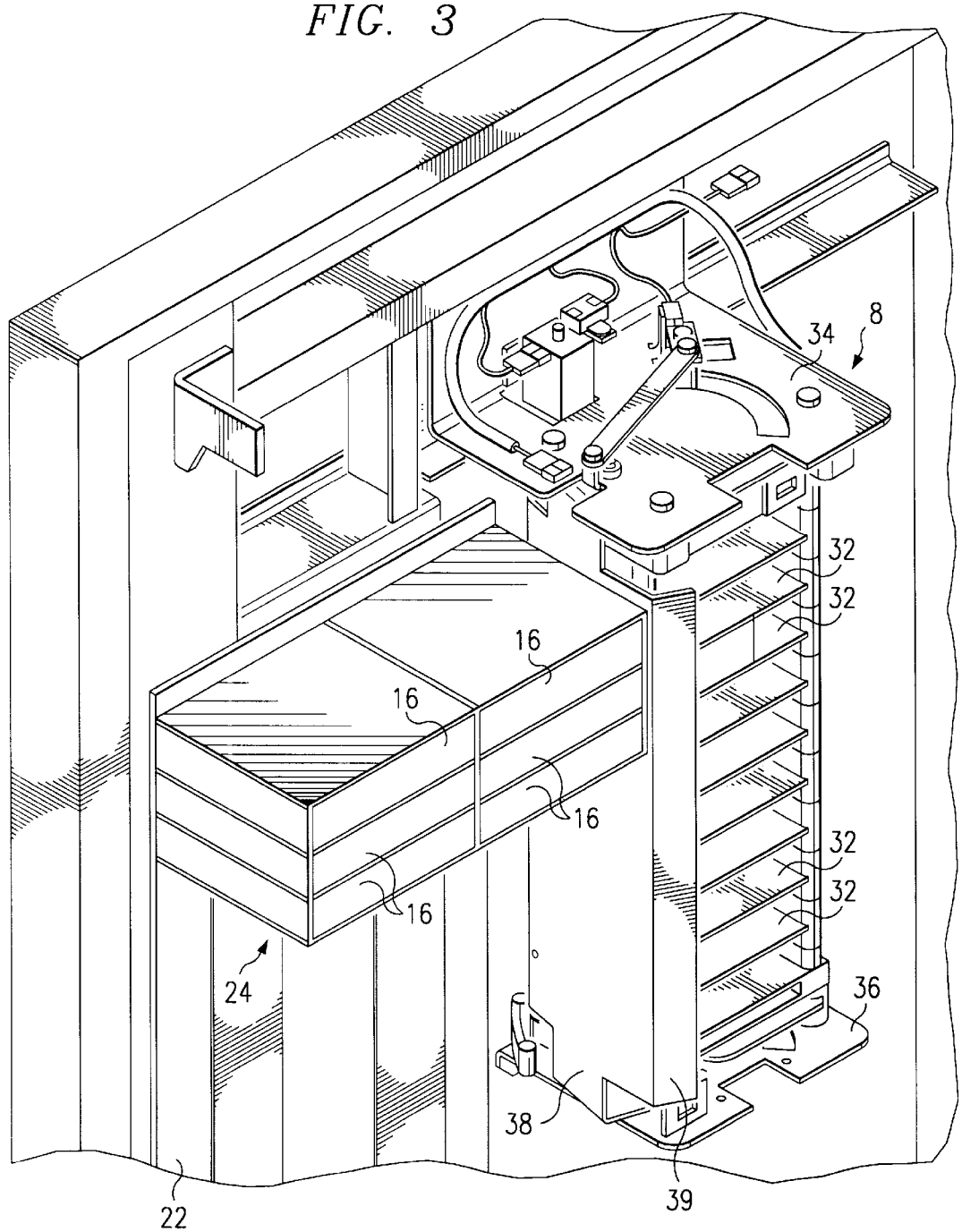
FIG. 3 is a perspective view of the robotics side of the input/output station.

In FIG. 3, the input/output station 8 is shown positioned along side of a mounting plate 22 in order to show that the cartridges positioned within the input/output station 8 are accessed by the same accessor 18 which removes the cartridges from the storage cells 16 as shown in FIG. 1. The storage cells 16 form a storage cell array 24 together with its mounting plate 22. The mounting plate 22 and the storage cell array 24 are shown in FIG. 3 for illustrative purposes only.

As shown in FIG. 3, the input/output station 8 is shown positioned alongside of the array of storage cells 24 generally fastened to the framework. The input/output station of FIG. 3 generally shows the robotics access or the accessor position of the storage system. The input/output station 8 includes a plurality of cells 32 positioned for access by the accessor 18 of FIG. 1. A top bracket 34 and a bottom bracket 36 hold the cells together and fasten the entire input/output station 8 onto the face of the library as shown in FIG. 2. A toggle bracket 38 is shown pivoted to the top bracket 34 and the bottom bracket 36 for pivoting into and out of the robotics access area as well as interfacing with the cartridges that are placed into the cells 32 by the operator. The toggle bracket 38 includes a cartridge stop 39 which prevents cartridges inserted by the operator through the input/output station 8 from falling into the robotics access area when the input/output station 8 is open. A more complete view of the input/output station 8 is shown in FIG. 4.

Figure 4:
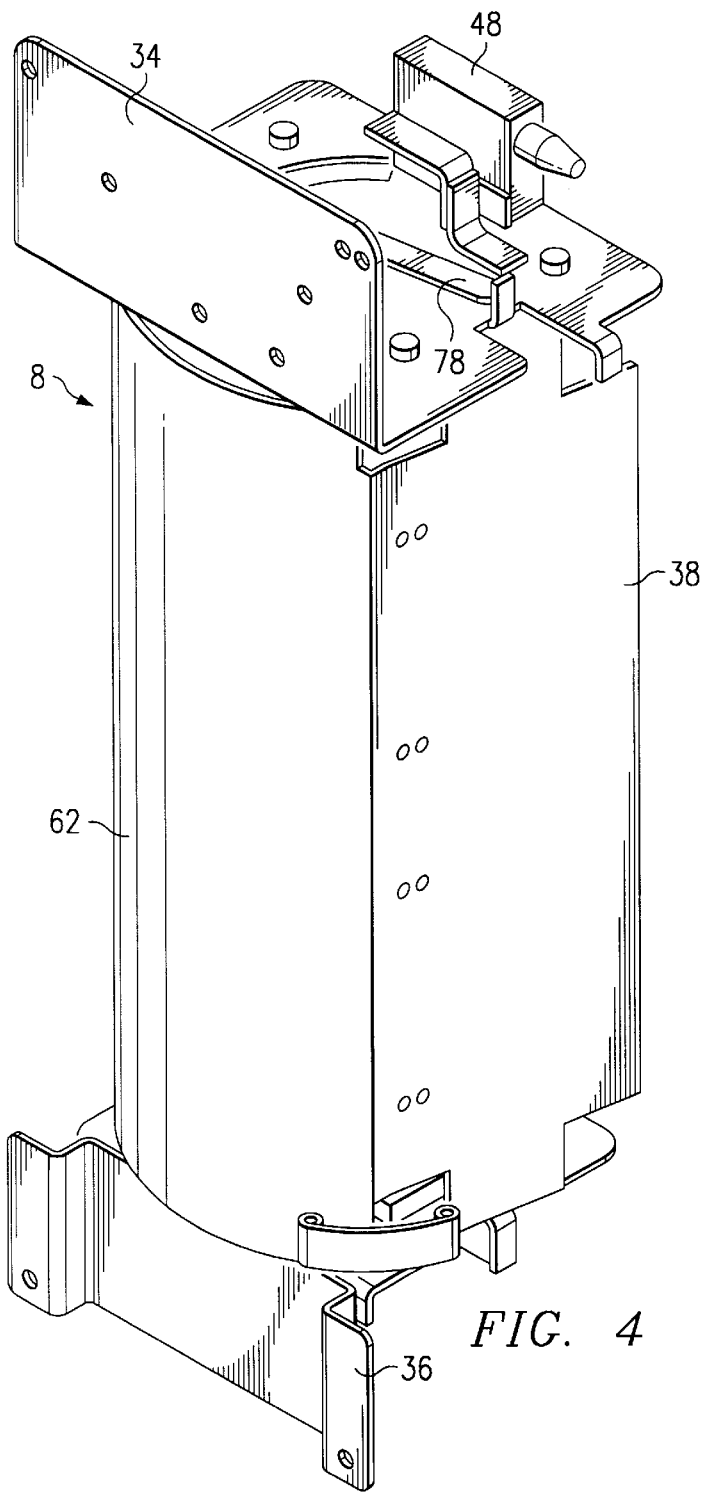
FIG. 4 is a perspective view of the input/output station showing the operator access side of the station assembly outside of the library system.

FIG. 4 shows the input/output station 8 as removed from the library system 10 with a view from the operator access position. At the operator access position, a door 62 is positioned for clockwise rotation to an open state by the operator. Opening the door 62 causes the toggle bracket 38 to rotate in a counter-clockwise rotation to provide a further open space at the front of the input/output station 8 for use by the operator in inserting cartridges. The toggle bracket 38 also operates to close access to the back or robotics access of the station 8 as will be discussed further later. A top bracket 34 and a bottom bracket 36 hold the pieces of the input/output station 8 together as well as providing the means to fasten the station 8 to the door 9 of the library frame. A more complete description of the input/output station 8 will be given in the following figures.

Figure 5:
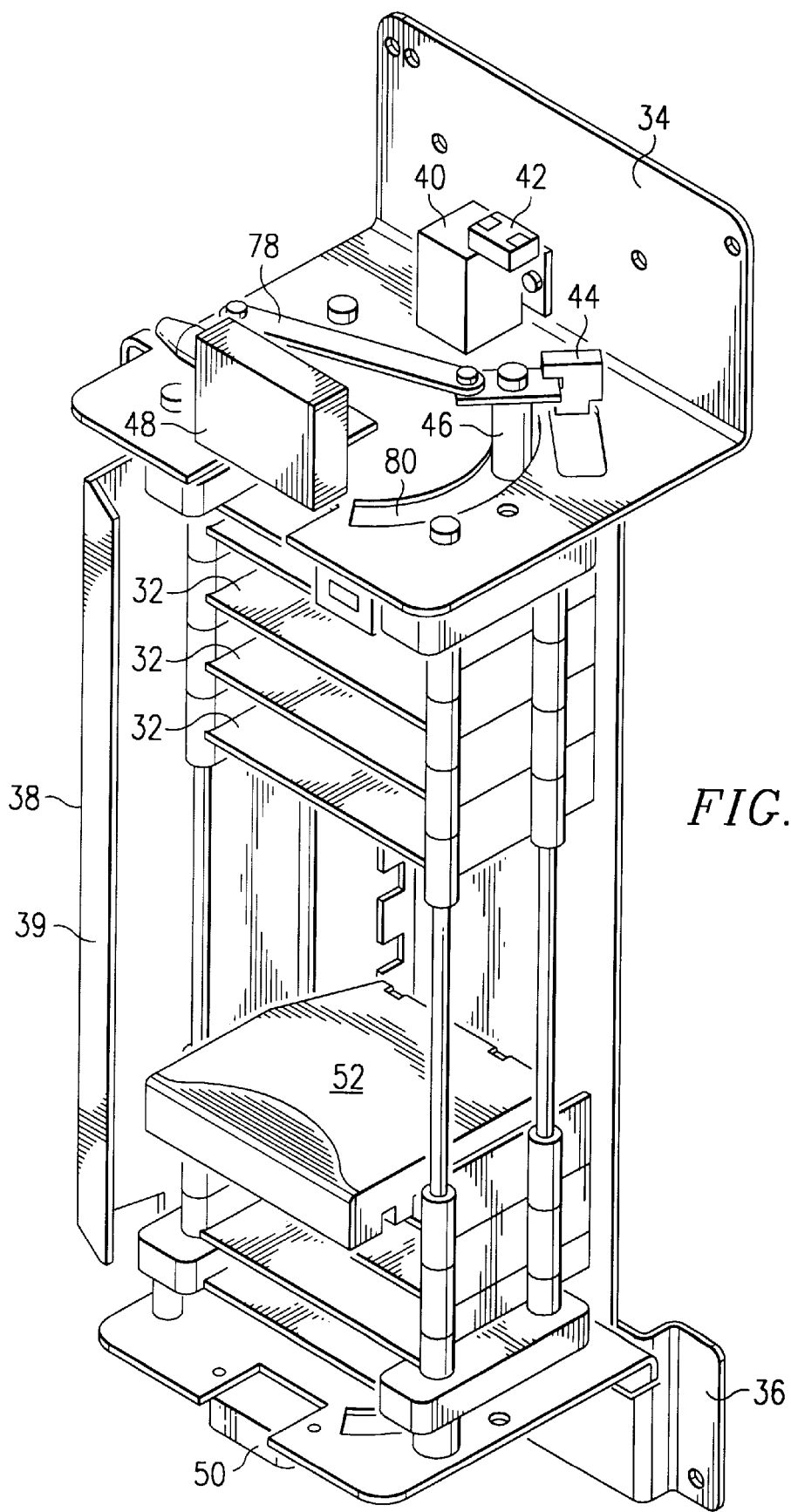
FIG. 5 is a perspective view of the input/output station of FIG. 4 showing the robotics access side.

As shown in FIG. 5, the top bracket 34 includes a door locking solenoid 40 and a door locked sensor 42. A door closed sensor 44 senses whether the pin 46 of the door is in a position where the door is completely closed. The top bracket 34 also includes a cartridge presence sensor 48 which together with a sensor reflector 50 mounted to the bottom bracket 36 senses whether a tape cartridge such as a tape cartridge 52 is in position by sending a light beam from the cartridge presence sensor 48 down to the reflector 50. If there is no cartridge, the light beam will return through the sensor reflector 50 back to the cartridge presence sensor 48 signaling that there is no cartridge in the input/output station 8. If there is a cartridge, the cartridge presence sensor 48 light beam is not reflected back signaling to the system that a cartridge is in the output station ready for access by the accessor. A better view of all of the pieces of the input/output station 8 is shown in the exploded view of FIG. 6.

Figure 6:
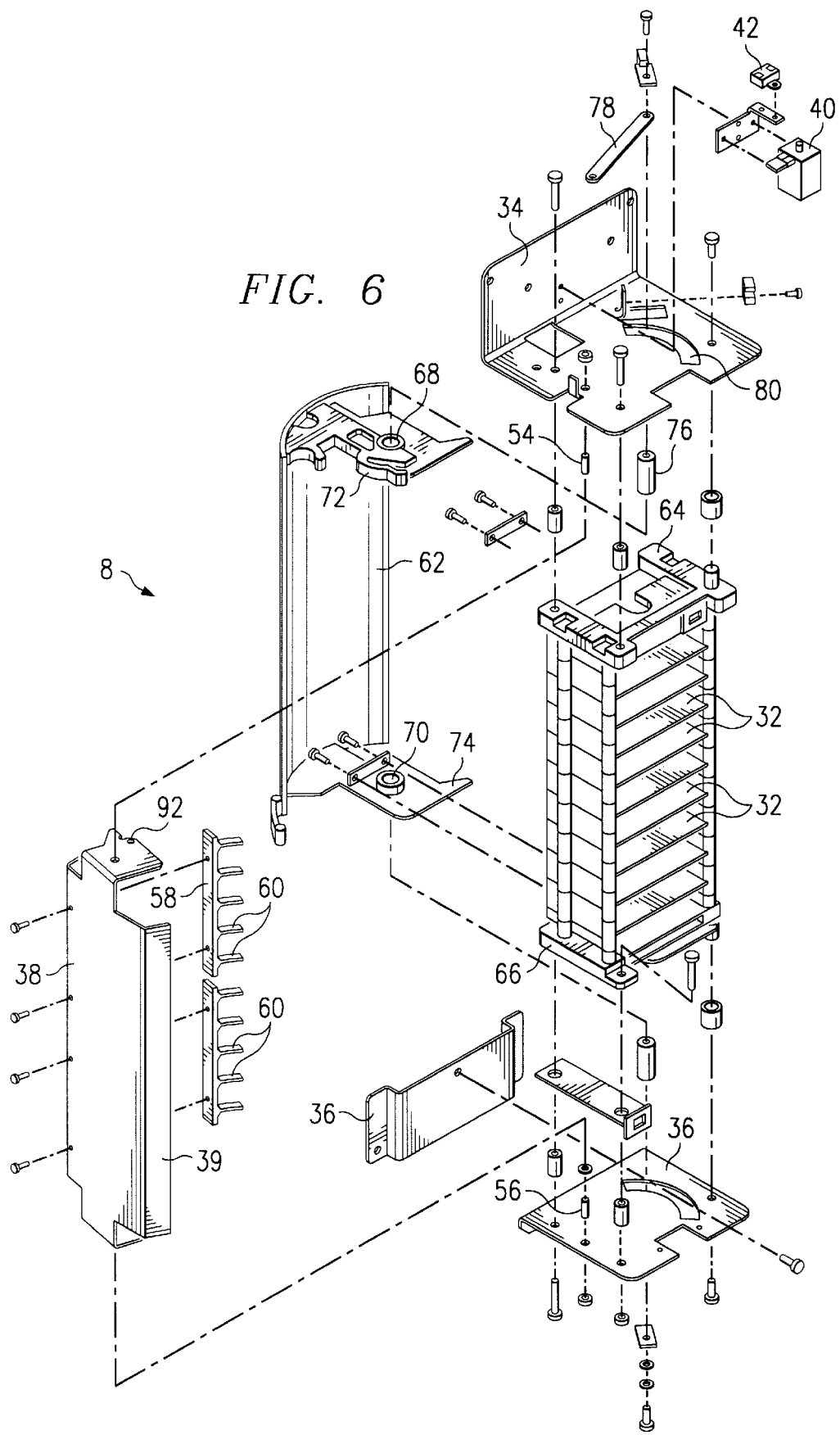
FIG. 6 is an exploded view of the input/output station of FIG. 4.

Referring now to FIG. 6, the input/output station 8 includes the toggle bracket 38 shown pivoted to the top bracket 34 through a pin 54 and pivoted to the bottom bracket 36 through a pin 56. Fastened to toggle bracket 38 is a strip 58 which includes a plurality of toggle fingers 60. The door 62 permits the operator access to the interior of the input/output station 8 when opened by the operator. The door 62 is pivoted to a top cell bracket 64 and the bottom cell bracket 66 through bearings 68 and 70 shown mounted to a top door cam 72 and bottom door mount 74, respectively. Cam 72 interfaces with pin 92 and is produced in the form of a cantilever spring as shown in FIG. 6. Manufacturer tolerances between the locations of a pivot 68 and pin 54 and the cam 72 and a cam follower 92 are absolved in the deflection of the cantilever spring. Bearing 68 interacts with the top cell bracket 64 while bearing 70 interacts with the bottom cell bracket 66. The bearings 68 and 70 permit the rotation of the door 62 into its open and closed positions. A door pin 76 is mounted to the top door cam 72 and passes through a slot 78 in the top bracket 34. The door pin 76, together with the spring 78, pass through the opening 80 in the top bracket 34 to provide a positive open and close position for the door 62, as will be discussed later.

In general operation, referring to FIGS. 2 and 4, the operator obtains access to the input/output station 8 by swinging the door 62 to its open position pivoting clockwise from the top position from top bracket 34. The door pin 76 operates in the slot 80 of the top plate 34 and through spring 78 finds the clockwise post position of the slot 80 where the spring 78 locks the door 62 into its open position. Opening the door 62 moves the door cam 72 such that the toggle bracket 38 rotates in a counter clockwise position moving the cartridge stop 39 of the toggle bracket 38 in an interference position from the robotics access portion and removes the toggle bracket 38 to clear the operator access from the door position of the input/output station 8. The toggle fingers 60 move out of position together with the toggle bracket 38. The door closed sensor 44 is interrupted because the pin 76 is now in its most clockwise position in the slot 80 and the spring 78 will hold the door open. After the cartridges are inserted into the cells 32 by the operator, the door 62 is moved into its closed position counter clockwise to close the access from the operator's standpoint. The toggle bracket 38 pivots in a clockwise position placing the toggle fingers 60 against the cartridge to perform the cartridge position indication according to the present invention. While the door 62 is opened, the cartridge stop 39 of the toggle bracket 38 blocks the accessor 18 access to the cells 32 through its input stop from the robotics side. This cartridge stop 39 also acts as an end stop to control the position of the cartridge as the operator inserts the cartridge into the library. The cartridge stop 39 prevents the operator from pushing the cartridge too far into the library into the path of the accessor 18.

Figure 7:
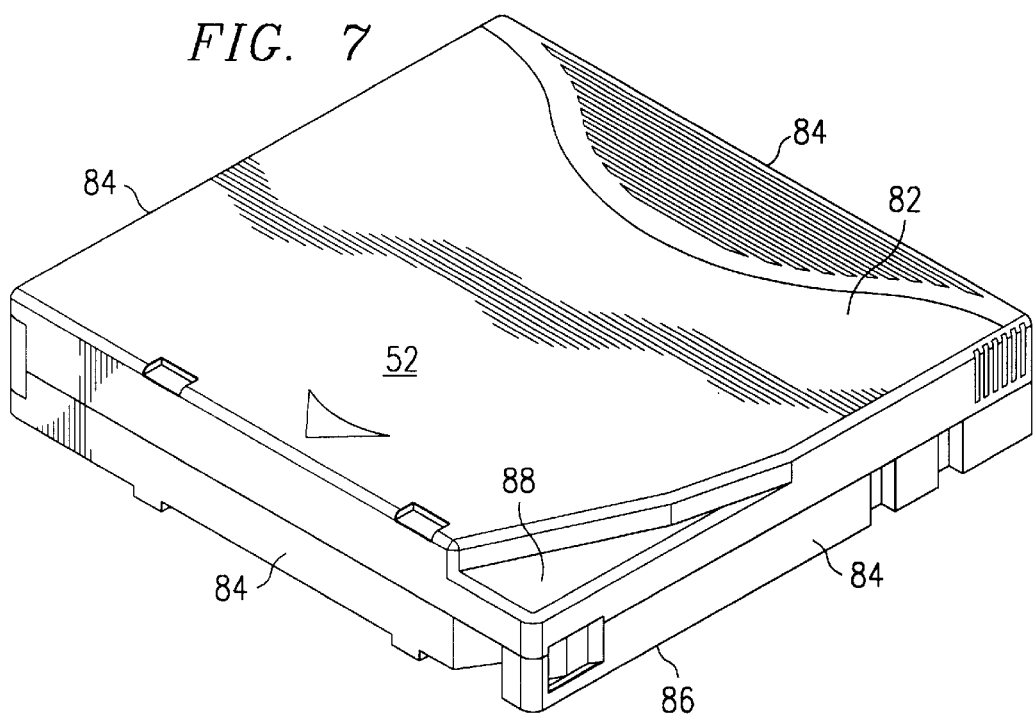
FIG. 7 is a perspective view of a cartridge according to an embodiment of the invention.

The tape cartridge 52 used in the present invention is shown in FIG. 7. Referring to FIG. 7, the tape cartridge 52 includes magnetic media interior to the enclosure and not generally seen exterior to the tape cartridge 52. The tape cartridge 52 is a specific cartridge shown with the invention but it is to be understood that the cartridge 52 is but one example of the plurality of cartridges 14 shown in FIG. 1. The tape cartridge 52 includes a top 82, four sides 84, and a bottom 86. A recess 88 is formed into one corner of the top 82 of the cartridge 52 which forms a cartridge orientation indicator, according to the present invention, to verify that the operator has correctly oriented the cartridges into the input/output station. The cartridge orientation indicator shown as recess 88 interacts with the toggle fingers 60 to permit the toggle bracket to rotate and thereby prevents the closure of the door 62 if the toggle bracket 38 cannot pivot clockwise into its closed position because the sensing fingers of the toggle fingers 60 do not clear the recess 88 of the tape cartridge 52. A correctly oriented cartridge in the input/output station is best discussed by referring to FIG. 8.

Figure 8:
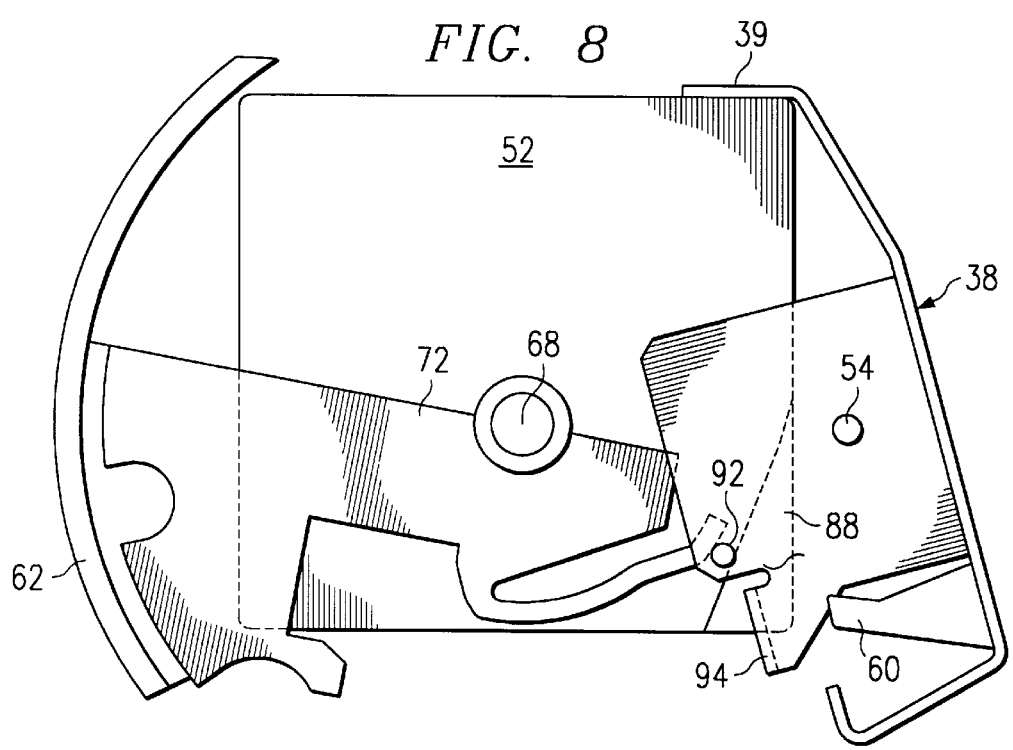
FIG. 8 is a top view showing the operation of the door cam assembly and the positioning of the door in open to allow operator access.
Figure 9:
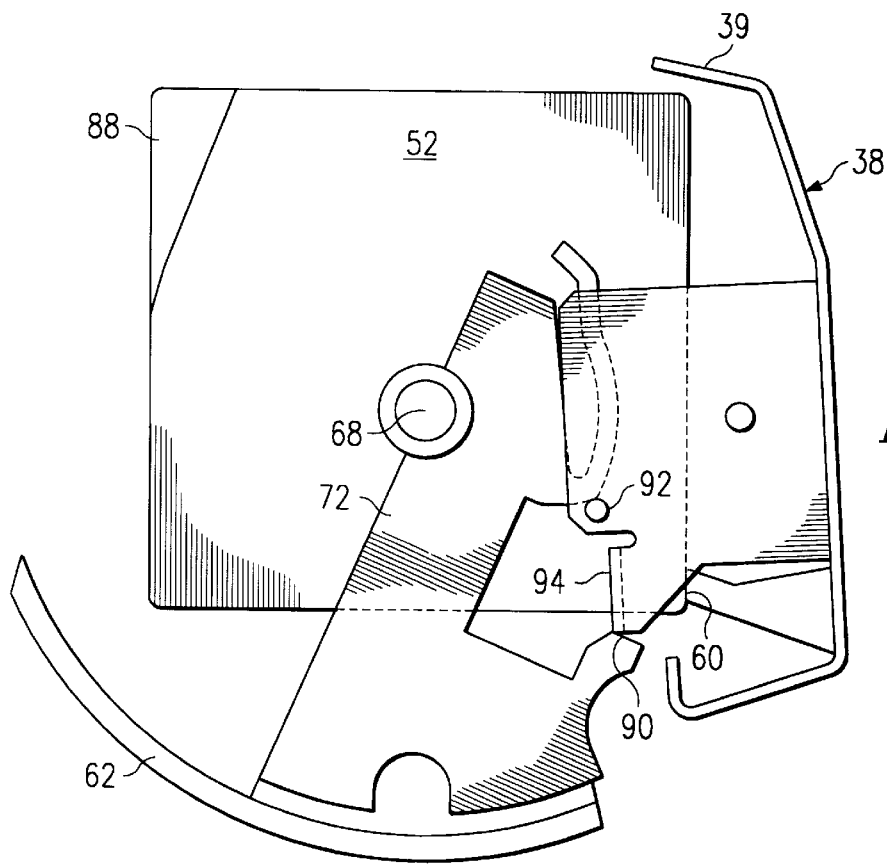
FIG. 9 shows the top view of the cam assembly of FIG. 8 with an incorrectly oriented cartridge and the prevention of the closing of the door.

Referring to FIG. 8, the correct orientation of the cartridge 52 is shown with its recess 88 positioned upward and to the front of the input/output station adjacent to the door 62. The top door cam 72 is shown rotating on the bearing 68 in the top cell bracket 64 (not shown). The toggle bracket 38 rotates around its top pin 54 as shown in FIG. 8 by virtue of the camming action of the top cam 72 and a toggle bracket camming pin 92 which is driven by the door cam 72 and a spring (not shown). The toggle finger 60 of the toggle bracket 38 is shown entering into the recess 88 of the cartridge 52. In this position, the toggle bracket 38 rotates clockwise completely, permitting the door 62 to be completely closed and pivoted as shown in FIG. 8. FIG. 8, therefore, shows a correctly oriented cartridge. FIG. 9 shows an incorrectly oriented cartridge and shows the interaction where the door cannot be closed.

Referring to FIG. 9, the cartridge 52 is shown incorrectly oriented with its recess 88 shown at the rear of the input/output station. In this orientation, the toggle finger 60 interferes against the cartridge 52 which prevents the toggle bracket 38 from rotating in a clockwise position and the door cam 72 interferes against the toggle bracket 38 at point 90. The operator then recognizes that the door cannot be closed because a cartridge is wrongly oriented in the input/output station and the operator retrieves the incorrectly oriented cartridge or cartridges and orients them correctly to permit the toggle finger 60 to enter the recess in a correct position. The position of the door 62, its top cam 72, together with the door cams pivot point 68 in the closed position for a correctly positioned cartridge, is shown in FIG. 10.

Figure 10:
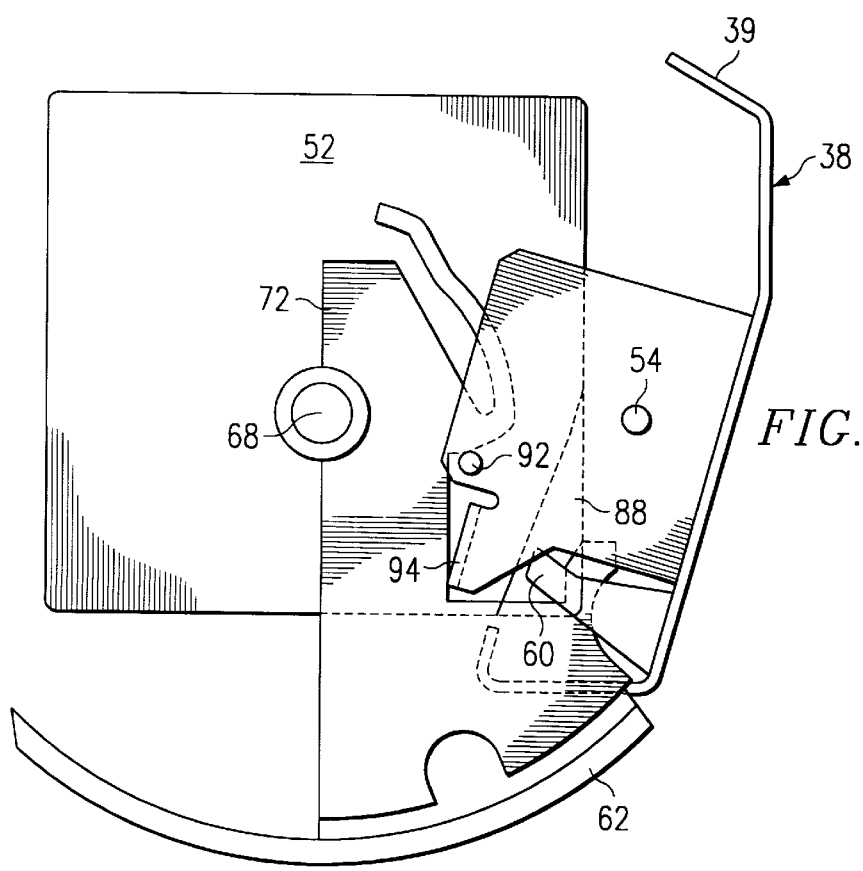
FIG. 10 is a top view of the cam assembly of FIG. 8 showing a correctly oriented cartridge in the closing of the door to the input/output station.

Referring now to FIG. 10, the door 62 is shown in its furthest most counter-clockwise position with the door closed and preventing operator access into the input/output cells 32. The cartridge 52 is shown correctly oriented with its recess 88 facing upward and to the right of the operator access station of the input/output station. The door cam 72 operates against the toggle cam follower 92 to rotate the toggle bracket 38 in a clockwise direction under the force of a spring (not shown) placing the toggle fingers 60 into the recess 88 to allow the closure of the door 62. The toggle bracket 38 rotates around the toggle pivot pin 54. The toggle fingers 60 are shown positioned to clear the cartridge recess 88 to allow the door 62 to be closed because interference bracket 94 of the toggle brackets 38 will be positioned out of interference with the door cam 72.

According to the previous description, the cartridge recess 88 provides the cartridge orientation indicator while the toggle fingers 60 provide the physical sensing of the cartridge orientation indicator, the recess 88, to permit the closure of the input/output station door 62 only when all of the cartridges 52 placed into the input/output station through the operator access point are correctly oriented. At that time, the operator can close the door 62 by pivoting the door in a counter clockwise position which causes the toggle bracket to pivot in a clockwise position with a pin 92 following the door cam 72 thereby allowing its toggle fingers 60 to enter into the cartridge recess 88 and remove the blocking portion 90 of the toggle bracket 38 from interference with the door cam 72. Rotation of the toggle bracket 38 also removes the cartridge stop 39 from blocking the cartridge 52 entry into the robotics area (FIG. 9) and thereby permits accessor 18 access to the cartridge 52 (FIG. 10). The orientation of the cartridges must all be correct to permit the door closing and to permit the further operation of the data processing system to access the entered cartridges.

While the invention has been particularly shown and described with reference to preferred embodiments thereof, it will be understood by those skilled in the art that various changes in form and detail may be made therein without departing from the spirit and scope of the invention. For instance, the cartridge 52 can contain other types of cartridge positioning/orienting indicators other than the cartridge recess 88 and the toggle fingers 60 can be formed and positioned to accommodate any such change in the cartridge positioning/orienting indicator system. The opening and closing of the door likewise can be in either rotation, it being known that is merely to pivot the interference bracket into and out of position with the cartridge to open the access to allow the cartridges to be placed into the input/output station while blocking the access by the robotics from the other station. The appended claims, therefore, are the only limitation on the described invention.

We claim:

1. A mass data storage and retrieval system comprising:
   a mass storage library;
   a plurality of cartridges, each of the cartridges having media for storing data information located within an enclosure having a top, bottom, front, rear and two sides encasing the media, means for providing access to the media and a cartridge positioning indicator shaped in the form of a recess at one corner of the cartridge;
   a plurality of data recorder modules for receiving and reading information from and writing information to the media of the cartridge for information storage;
   at least one storage module each having a plurality of storage cells for retaining the cartridges;
   at least one input/output station having a plurality of input/output cells for retaining the cartridges and for externally entering and removing cartridges into and out of the mass data storage and retrieval system; and
   an accessor associated with the storage module for retrieving the cartridges from the storage cells and for transporting the cartridges between the storage module and one of the plurality of data recorders and for returning the cartridges to the storage module, and for transporting the cartridges between the storage cells and input/output cells;
   wherein the input/output station includes a toggle bracket having fingers, one for each input/output cell in the input/output station, said toggle bracket pivoted to allow access to the input/output cells when the input/output station is open and pivoted to position said fingers of the toggle bracket to enter the recess of correctly positioned cartridges when the input/output station is closed, said toggle bracket preventing the closure of the input/output station if one or more cartridges placed into the input/output station is incorrectly oriented such that one or more of said fingers fails to enter the recess of the incorrectly oriented cartridge.

2. The system as in claim 1 wherein said toggle bracket includes a cartridge stop apparatus that, when pivoted by the open input/output station, permits positioning of the cartridge into the input/output station and prevents the entry of the cartridge into the mass data storage and retrieval system.

3. A mass storage library comprising:
   a plurality of cartridges, each of the cartridges having media for storing data information within an enclosure having a top, bottom, front, rear and two sides encasing the media, means for providing access to the media within the enclosure at one front corner of the enclosure, and a cartridge positioning indicator shaped in the form of a recess at one corner of the cartridge;
   at least one storage module each having a plurality of storage cells for retaining the cartridges;
   at least one input/output station having a plurality of input/output cells for retaining the cartridges and for externally entering and removing cartridges into and out of the mass storage library;
   a plurality of data recorder modules for receiving and reading information from and writing information to the media of the cartridge for information storage; and
   an accessor associated with the storage module for transportation of the cartridges between the storage cells and the input/output cells and for transporting cartridges between the storage cells and the data recorder modules;
   wherein the input/output station includes a toggle bracket having fingers, one for each input/output cell in the and pivoted to position said fingers of the toggle bracket to enter the recess of correctly positioned cartridges when the input/output station is closed, said toggle bracket preventing the closure of the input/output station if one or more cartridges placed into the input/output station is incorrectly oriented such that one or more of said fingers fails to enter the recess of the incorrectly oriented cartridge.

4. The system as in claim 3 wherein said toggle bracket includes a cartridge stop apparatus that, when pivoted by the open input/output station, permits positioning of the cartridge into the input/output station and prevents the entry of the cartridge into the mass storage library.

5. A tape cartridge library system comprising:
   a plurality of tape cartridges each of the tape cartridges having media for storing data information located within an enclosure having a top, bottom, front, rear and two sides encasing the media, means for providing access to the media within the enclosure at one front corner of the enclosure, and a cartridge positioning indicator shaped in the form of a recess at one corner of the cartridge;
   at least one storage module each having a plurality of storage cells for retaining the cartridges;
   at least one input/output station having a plurality of input/output cells for retaining the cartridges and for externally entering and removing cartridges into and out of the tape cartridge library system;
   a plurality of data recorder modules for receiving and reading information from and writing information to the media of the cartridge for information storage;
   an accessor associated with the storage module for transportation of the cartridges between the storage cells and
   an accessor associated with the storage module for transportation of the cartridges between the storage cells and the input/output cells and for transporting cartridges between the storage cells and the data recorder modules;

wherein the input/output station includes a door having a door cam fastened to the door and pivotally connected to a station frame and a toggle bracket pivotally connected to the station frame and rotated by the door cams, said toggle bracket having fingers, one for each input/output cell in the input/output station, said toggle bracket pivoted to allow access to the input/output cells when the input/output station is open and pivoted to position said fingers of the toggle bracket to enter the recess of correctly positioned cartridges when the input/output station is closed, said toggle bracket preventing the closure of the input/output station if one or more cartridges placed into the input/output station is incorrectly oriented such that one or more of said fingers fails to enter the recess of the incorrectly oriented cartridge.

6. The system as in claim 5, wherein said toggle bracket further including a cartridge stop position that, when pivoted by the open input/output station, permits positioning of the cartridge into the input/output station and prevents the entry of the cartridge into the tape cartridge library system.

* * * * *